United States Patent
Crippa et al.

(10) Patent No.: US 9,291,224 B2
(45) Date of Patent: Mar. 22, 2016

(54) CALIPER BODIES FOR DISC BRAKES

(75) Inventors: Cristian Crippa, Almenno San Bartolomeo (IT); Paolo Cesani, Bergamo (IT); Massimo Preda, Bergamo (IT)

(73) Assignee: FRENI BREMBO S.p.A., Curno, Bergamo (IT)

( * ) Notice: Subject to any disclaimer, the term of this patent is extended or adjusted under 35 U.S.C. 154(b) by 391 days.

(21) Appl. No.: 13/637,995

(22) PCT Filed: Mar. 30, 2011

(86) PCT No.: PCT/IB2011/051351
§ 371 (c)(1),
(2), (4) Date: Dec. 27, 2012

(87) PCT Pub. No.: WO2011/121553
PCT Pub. Date: Oct. 6, 2011

(65) Prior Publication Data
US 2013/0092481 A1   Apr. 18, 2013

(30) Foreign Application Priority Data

Mar. 31, 2010   (IT) .............................. MI2010A0537

(51) Int. Cl.
*F16D 55/228*   (2006.01)
*F16D 65/092*   (2006.01)
*F16D 65/00*   (2006.01)
*F16D 55/00*   (2006.01)

(52) U.S. Cl.
CPC .......... *F16D 65/0068* (2013.01); *F16D 55/228* (2013.01); *F16D 65/0075* (2013.01); *F16D 2055/0016* (2013.01); *F16D 2055/0091* (2013.01); *F16D 2250/0007* (2013.01)

(58) Field of Classification Search
CPC ............ F16D 65/0068; F16D 65/0075; F16D 2065/0033; F16D 2065/0016; F16D 2065/002; F16D 2055/0033; F16D 2055/0016; F16D 2055/002; F16D 55/228; F16D 2055/0019
USPC ....................................... 188/73.47
See application file for complete search history.

(56) References Cited

U.S. PATENT DOCUMENTS

| | | | |
|---|---|---|---|
| 2007/0170020 A1* | 7/2007 | Halasy-Wimmer et al. .......... | 188/73.43 |
| 2008/0185243 A1* | 8/2008 | Previtali et al. .......... | 188/250 B |
| 2009/0071767 A1* | 3/2009 | Bass et al. .................. | 188/72.5 |
| 2009/0236187 A1* | 9/2009 | Bach et al. .................. | 188/72.5 |

FOREIGN PATENT DOCUMENTS

| | | |
|---|---|---|
| DE | 102006052177 A1 | 5/2008 |
| DE | 102008029582 A1 | 4/2009 |
| EP | 1865218 A1 | 12/2007 |
| EP | 1898116 A1 | 3/2008 |
| EP | 1911989 A1 | 4/2008 |
| WO | 2005078306 A1 | 8/2005 |

* cited by examiner

*Primary Examiner* — Anna Momper
(74) *Attorney, Agent, or Firm* — Robert E. Alderson, Jr.

(57) ABSTRACT

Caliper bodies for disc brakes are provided. Such caliper bodies are suitable for being arranged astride a disc for a disc brake. Calipers which include such caliper bodies are also provided.

18 Claims, 18 Drawing Sheets

CALIPER BODIES FOR DISC BRAKES

CROSS-REFERENCE TO RELATED APPLICATIONS

This application is a National Phase Application of PCT International Application No. PCT/IB2011/051351, International Filing Date, Mar. 30, 2011 claiming priority to Italian Patent Application No. MI2010A000537, filed Mar. 31, 2010, both of which are hereby incorporated by reference in their entirety.

FIELD OF THE INVENTION

The present invention refers to a caliper body for a disc brake, for example for a motor vehicle, as well as to a caliper for a disc brake that comprises such a body.

BACKGROUND OF THE INVENTION

In particular, in a disc brake, the brake caliper is arranged astride of the outer peripheral edge of a brake disc. The brake caliper usually comprises a body having two elongated elements that are arranged so as to face opposite braking surfaces of a disc. Friction pads are foreseen arranged between each elongated element of the caliper and the braking surfaces of the brake disc. At least one of the elongated elements of the body of the caliper has cylinders suitable for receiving hydraulic pistons capable of exerting a thrusting action on the pads abutting them against the braking surfaces of the disc to exert a braking action on the vehicle.

The brake calipers are usually fixedly connected to a support structure that stays still on the vehicle, like for example a stub axle of a suspension of a vehicle.

In a typical arrangement, one of the two elongated elements has two or more mounting portions of the body of the caliper to the support structure, for example foreseeing slots or eyelets, for example arranged axially, or through-holes, for example arranged radially, suitable for receiving screws for attaching the caliper that, with their ends, are received in threaded holes foreseen on the support of the caliper.

In a typical caliper body construction, the elongated elements arranged facing the braking surfaces of the disc are connected together by bridge elements arranged astride of the disc.

A caliper body of this type is described in EP-A-2022999. In FIG. 1 of EP-A-2022999 a caliper body of the type with a fixed caliper is shown. This caliper body is of the monoblock type comprising two elongated elements the ends of which are connected together by bridges. Stiffening shafts extend between the elongated elements and between the two bridges forming a cross-type structure.

The caliper comprises different components mounted on the body such as pistons, gaskets, draining devices and brake fluid supply ducts.

Typically, the body of the caliper is made from metal like for example aluminium, or aluminium alloy or cast iron. The body of the caliper can be obtained by fusion, but also by mechanical chip-removal, as well as by forging.

The body of the caliper can be produced both in a single piece or monoblock, but also in two half-calipers typically connected together along a plane that usually coincides with the middle plane of the disc on which the caliper is arranged astride.

In the case in which the driver of the vehicle wants to brake or slow down the travel of the vehicle, he applies a force on the brake pedal, in the case of an automobile. Such a force on the brake pedal, through a brake pump exerts a pressure on the brake fluid that through a duct applies to the brake fluid present in the hydraulic circuit arranged inside the body of the caliper until it reaches the cylinders where the pressure is exerted on the surface of the bottom of the pistons forcing them to clamp against the pads, which in turn abut against the braking surfaces of the disc.

The pressure action of the brake fluid is also exerted on the bottom wall of the cylinder determining a reaction in the body of the caliper that deforms it away from the surfaces of the disc. This deformation of the body of the caliper leads to an increase in the stroke of the pistons and thus to an increase in the stroke of the brake pedal. The body of the caliper also deforms as a function of the torque exerted by the action of the piston that, abutting the pads against the braking surfaces of the disc, applies a deformation moment in directions that form torque arms with respect to the attachment points of the caliper body to its support. These torques deform the caliper body also in a tangential and radial direction with respect to the disc, as well as in an axial direction.

The caliper body must therefore have a sufficient structural rigidity, so as to ensure that this deformation of the body of the caliper caused by the braking action is kept within tolerable values, which, as well as avoiding damage to the braking system, do not create the feeling of a poor braking system for the driver, determining an extra stroke of the lever or pedal of the braking system creating the feeling of a "spongy" system. This requirement pushes towards having extremely rigid structures for the bodies of the calipers and therefore towards increasing their bulk and weight.

On the other hand, the body of the caliper, since it is fixedly connected to the suspension of the vehicle and is arranged astride of the disc, is one of the unsuspended masses that it is wished to reduce as much as possible in order to increase the performance of the vehicle.

Of course, these considerations are taken to the extreme when the vehicle is of the type for racing and the user wishes to have a braking system that is extremely responsive to his commands and at the same time extremely light so as not to penalise the performance of the racing vehicle.

There is therefore a great need for a caliper body for a disc brake that has improved structural characteristics for the same weight of the body of the caliper, or else with the same structural characteristics having a lower weight with respect to the solutions of the prior art. There are known solutions for caliper bodies that are specially studied to increase the characteristics of structural rigidity. For example the aforementioned patent application EP-A-2022999, patent application EP-A-153497, American patent U.S. Pat. No. 6,708,802, European patent application EP-A-1911989, international patent application PCT/EP2005/050615, Japanese patent application JP-A-09257063 and American patent U.S. Pat. No. 3,183,999 all present solutions for bodies for brake calipers equipped with reinforcement elements, for example arranged around the caliper bodies. In some of these known solutions the caliper body is of the symmetrical type according to planes passing through the axis of the disc or through the middle of the disc. In other solutions the caliper body has big and distributed windows that form elongated reinforcement elements arranged longitudinally to the body of the caliper. Although satisfactory from many points of view these known solutions nevertheless do not allow structures to be obtained that maximise the structural rigidity of the body of the caliper, reducing weights and at the same time capable of keeping the bulk as low as possible so as to facilitate the mounting of the body of the caliper even inside rims and wheels on which brake discs having a large diameter are mounted.

SUMMARY OF THE INVENTION

These and further purposes can be accomplished by caliper bodies and calipers described herein.

In accordance with a general embodiment, a caliper body for a disc brake is suitable for being arranged astride of a disc per disc brake.

Said disc has a first braking surface and a second braking surface opposite the first.

Said disc defines an axial direction A-A parallel to a rotation axis thereof a-a, the latter defining an axial outward direction AO when facing away from the vehicle, a tangential or circumferential direction T-T parallel to one of its braking surfaces, the latter defining a tangential outward direction TO when facing away from the caliper body, with disc entry direction I and disc exit direction U, and a radial direction R-R perpendicular to the axial direction A-A and to the circumferential or tangential direction T-T, the latter defining a radial outward direction RO when facing away from the rotation axis of the disc.

Advantageously, said caliper body comprises a mounting-side elongated portion or mounting equipped with at least one mounting portion suitable for being connected to a support for the caliper.

Said mounting-side elongated portion comprises a disc entry-side first tangential end and a disc exit-side second tangential end.

Said mounting-side elongated portion being suitable for facing, with an axial inner surface thereof, towards the first braking surface of the disc.

Said body also comprises a non mounting-side elongated portion facing, with an axial inner surface thereof, towards the second braking surface of the disc and comprises a disc entry-side first tangential end and a disc exit-side second end.

Each elongated portion houses or forms at least two cylinders each suitable for receiving a piston to exert a pressure on at least one pad housed between said elongated portion of the caliper and said braking surfaces of the disc.

Said elongated portions are connected together by a first end bridge that connects the two disc entry-side tangential ends. Said bridge is suitable for being arranged astride of the disc.

Said elongated portions are connected by a second end bridge that connects the two disc exit-side tangential ends. Said second bridge is suitable for being arranged astride of the disc.

Said caliper body also comprises at least three central bridges connecting the two elongated portions in their regions arranged inside the two end bridges. Each of said central bridges connects to said elongated portions at the side of said at least two cylinders forming at least four through-windows in said caliper body.

In accordance with an embodiment, outside of the cylinders there are two connection bridges of the elongated portions.

In accordance with an embodiment, said caliper body comprises four central bridges, two intermediate bridges and two middle bridges, said central bridges being arranged connecting the two elongated portions in their regions arranged inside the two end bridges. Each of said central bridges connects to said elongated portions at the sides of a cylinder of three cylinders foreseen for each elongated portion, together with the elongated portions forming at least five through-windows in said caliper body.

In accordance with an embodiment, each connection bridge between said elongated portions comprises:
  a first joining portion, joined to the mounting-side elongated portion and arranged substantially in the radial direction R-R;
  a second joining portion joined to the non mounting-side elongated portion arranged substantially the radial direction R-R;
  a third bridge portion joined to the first joining portion and to the second joining portion and arranged substantially in the axial direction A-A;
said portions configuring the bridge substantially like an inverted "U" suitable for being arranged astride of the disc.

In accordance with an embodiment, each bridge is connected to the adjacent bridge through a further bridge transversal to it or tangential bridge, said tangential bridge defining two windows passing through the body of the caliper between the bridge and the adjacent bridge.

In accordance with an embodiment, between a disc entry bridge and an adjacent intermediate bridge there is an entry-side tangential bridge that forms a mounting-side disc entry bridge window and a non mounting-side disc entry bridge window.

Between the intermediate bridge and an adjacent central or middle bridge there is an intermediate tangential bridge that forms a window between intermediate bridge and central or middle bridge on the mounting side and a window between intermediate bridge and central or middle bridge on the non mounting side.

Between the central or middle bridge and an adjacent central or middle bridge there is a central tangential bridge that forms a window between central bridge and central bridge on the mounting side and a window between central bridge and central bridge on the non mounting side.

Between the central or middle bridge and an adjacent intermediate bridge there is an intermediate tangential bridge that forms a window between central bridge and intermediate bridge on the mounting side and a window between central bridge and intermediate bridge on the non mounting side.

Between the intermediate bridge and an adjacent end bridge on the exit side there is a tangential end bridge that forms a window between intermediate bridge and disc exit-side bridge on the mounting side and a window between intermediate bridge and disc exit-side bridge on the non mounting side.

In accordance with an embodiment, two adjacent bridges define a through-window that crosses the caliper body in the axial direction A-A.

In accordance with an embodiment, said end bridges have a foil-shaped bridge body that lies substantially parallel to a plane, preferably, but not necessarily, the same plane.

In accordance with an embodiment, said mounting-side elongated portion and said non mounting-side elongated portion extend in the tangential direction T-T substantially in an arc of circle, housing or forming the cylinders so that they project from said mounting-side elongated portion and said non mounting-side elongated portion in the radial outward direction RO and in the opposite radial direction.

In accordance with an embodiment, two central or middle bridges are connected together by a central tangential bridge directed tangentially T-T, which together with said central or middle bridges defines two through-windows that, in the radial direction R-R, have an edge curved in a bulb.

In accordance with an embodiment, said intermediate bridges house mounting portions of the caliper body to a support for the caliper body, for example a stub axle.

In accordance with an embodiment, said central or middle bridges have a portion that projects to the non mounting-side elongated portion with a radially outer surface in which a lightening groove is formed.

In accordance with an embodiment, said mounting-side non mounting-side elongated portions house or form each three cylinders and they are connected together by six bridges and by tangential bridges that define ten through-windows in the radial direction to the caliper body and in the axial direction to the caliper body.

In accordance with an embodiment, said caliper body is a monoblock or a body in a single piece.

In accordance with an embodiment, advantageously, a caliper body as described above is used in a caliper for a disc brake.

Further purposes, solutions and advantages are present in the embodiments described hereafter and claimed in the dependent claims attached hereto.

Different embodiments of the invention are described hereafter through example embodiments given only as examples and not for limiting purposes, with reference in particular to the attached figures briefly described below.

DETAILED DESCRIPTION

Figure 1:
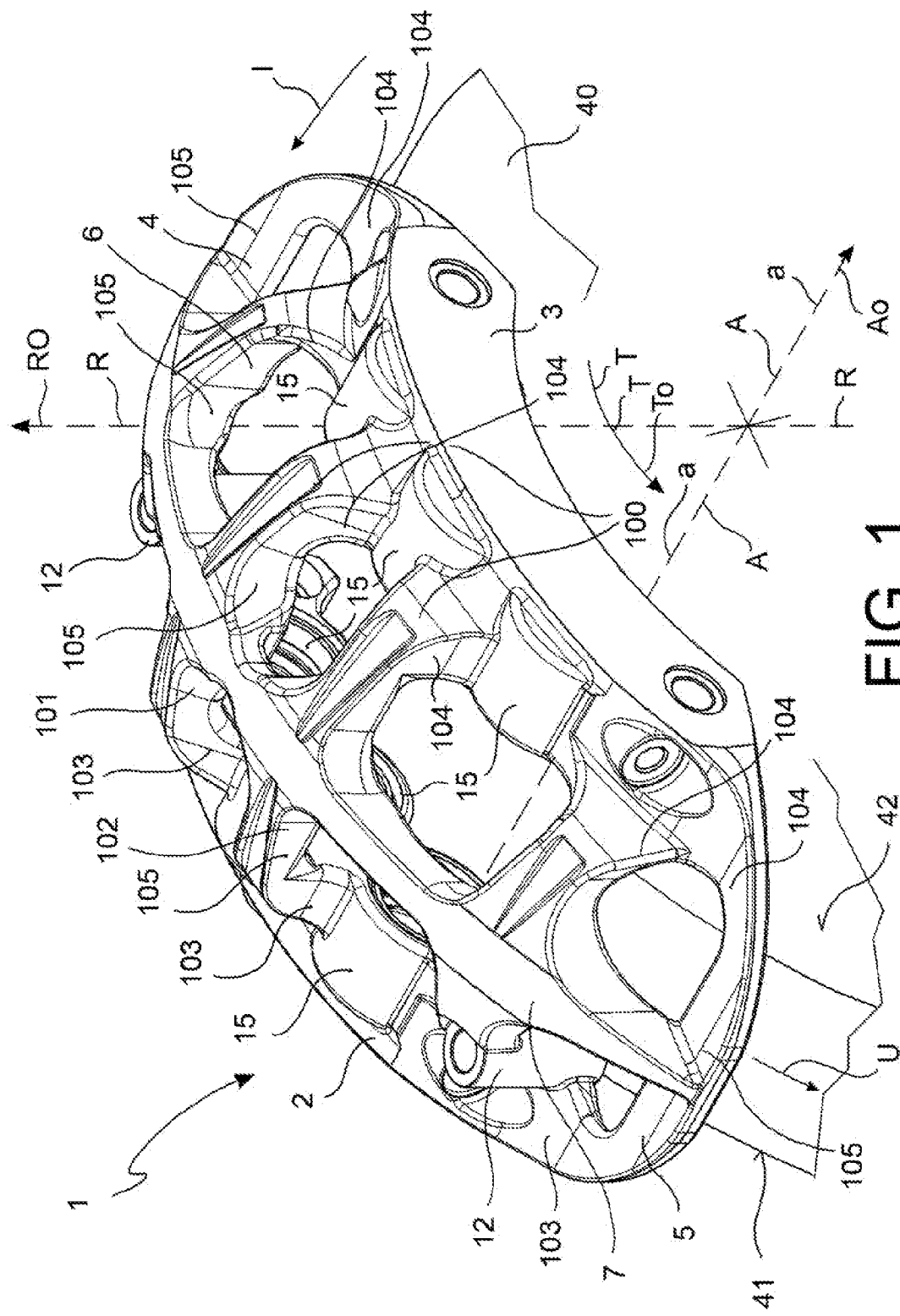
FIG. 1 shows an axonometric view of a caliper for a disc brake represented from above and outside of the vehicle, i.e. the side of the elongated portion not for mounting to the support of the caliper.
Figure 2:
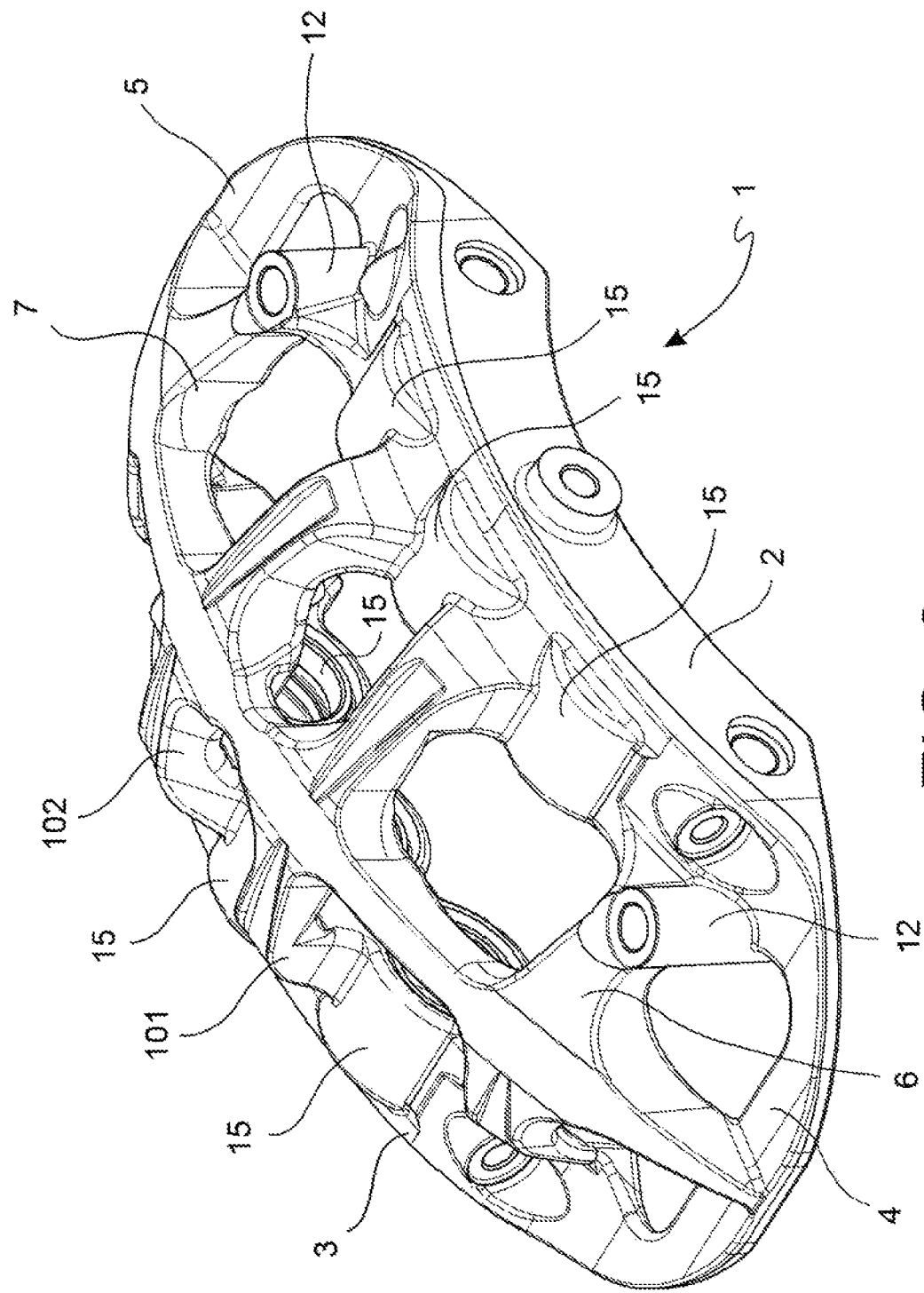
FIG. 2 shows an axonometric view of the caliper for a disc brake of FIG. 1 represented from above and inside the vehicle, i.e. the side of the elongated portion for mounting to the support of the caliper.
Figure 3:
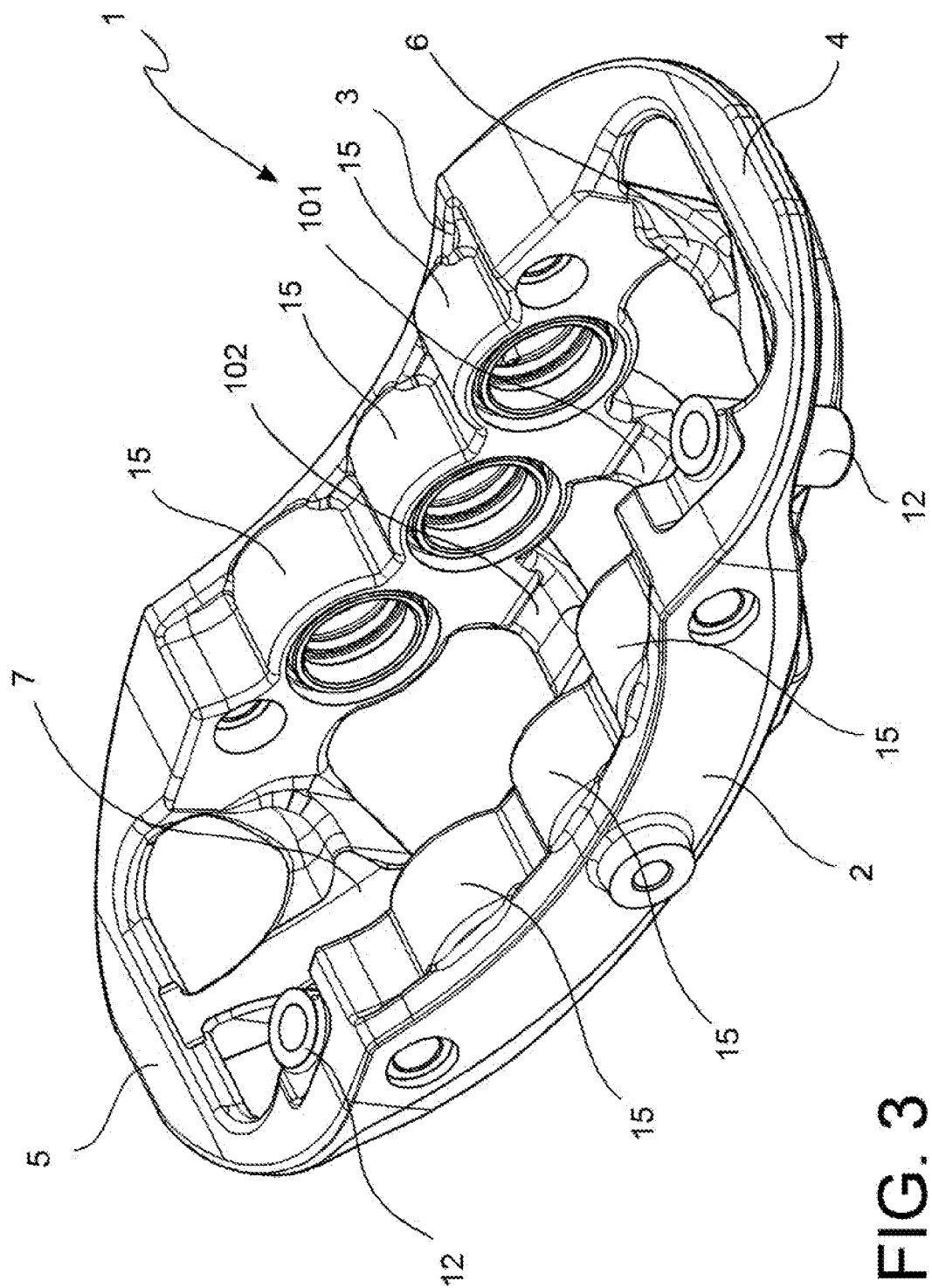
FIG. 3 shows an axonometric view of the caliper for a disc brake of FIG. 1 represented from below and inside the vehicle, i.e. the side of the elongated portion for mounting to the support of the caliper.
Figure 4:
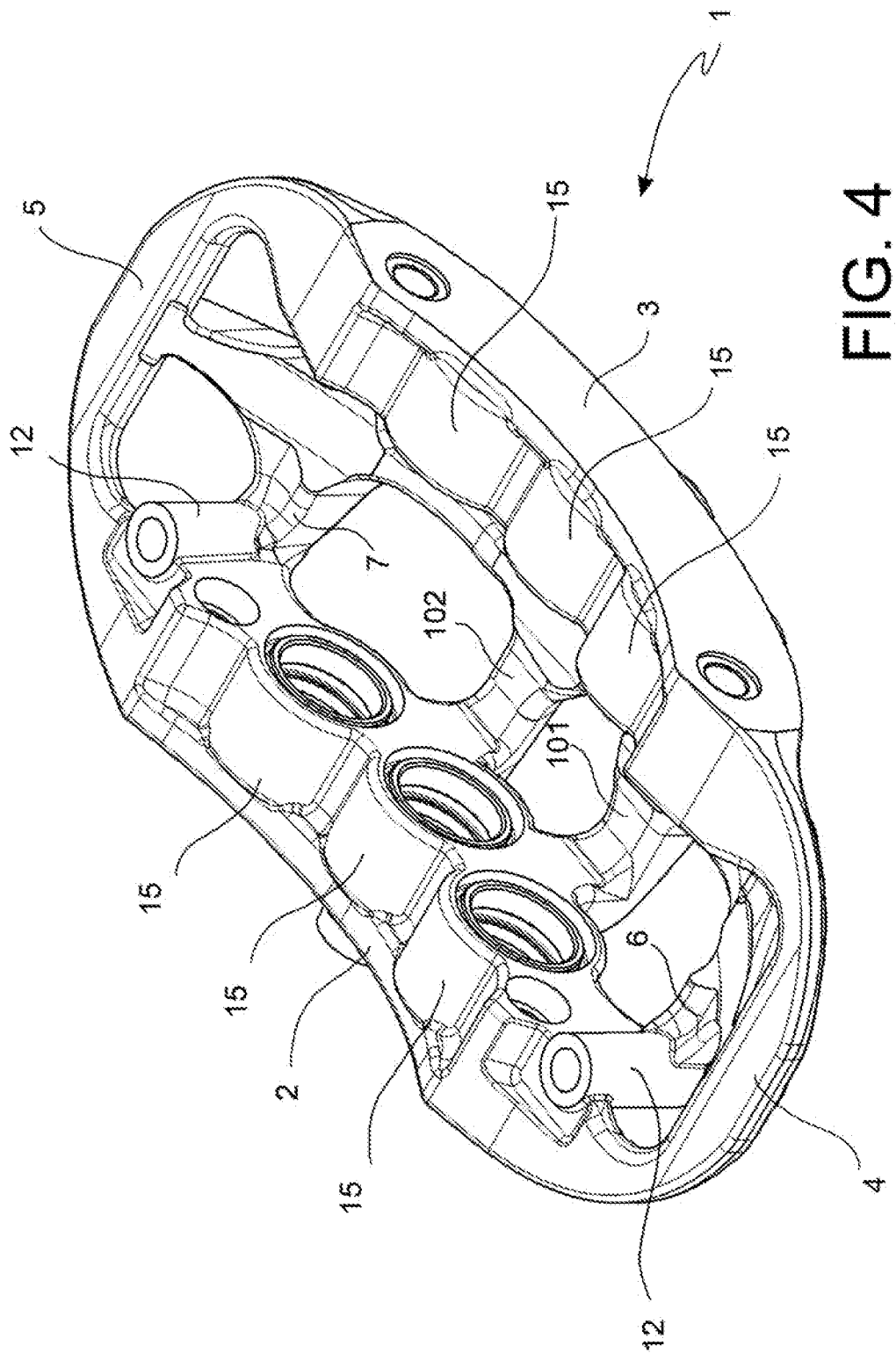
FIG. 4 shows an axonometric view of the caliper for a disc brake of FIG. 1 represented from below and outside the vehicle, i.e. the side of the elongated portion not for mounting to the support of the caliper.
Figure 5:
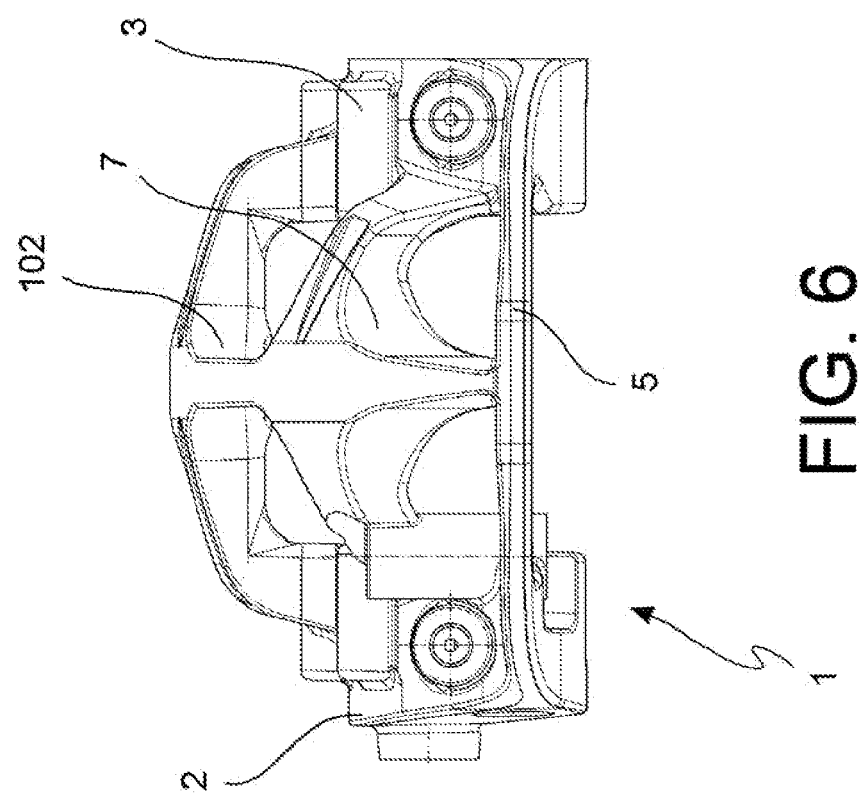
FIG. 5 illustrates a side view from the disc entry-side of the caliper of FIG. 1.
Figure 6:
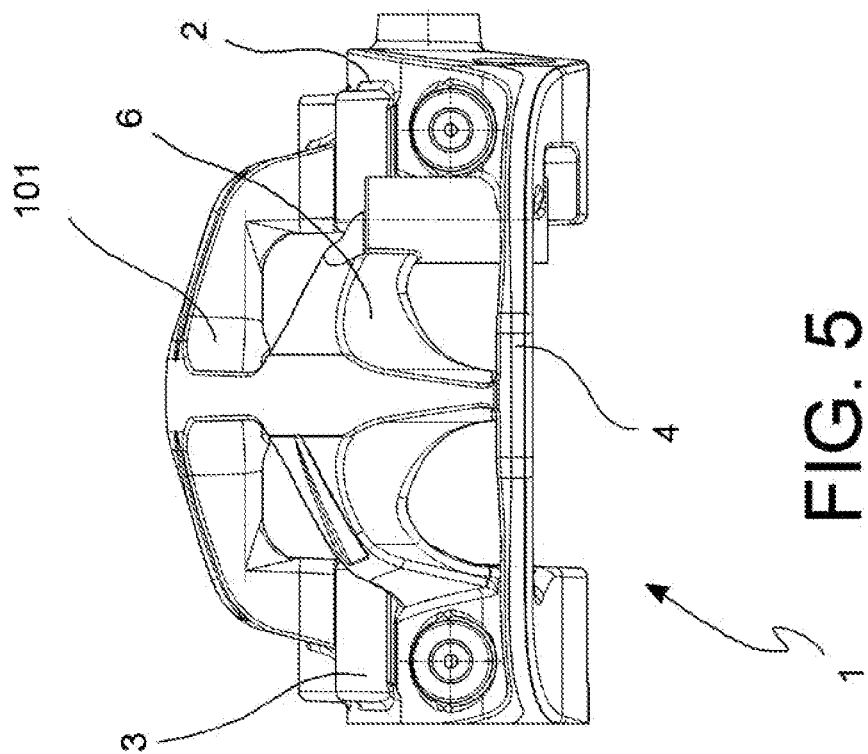
FIG. 6 illustrates a side view from the disc exit-side of the caliper of FIG. 1.
Figure 7:
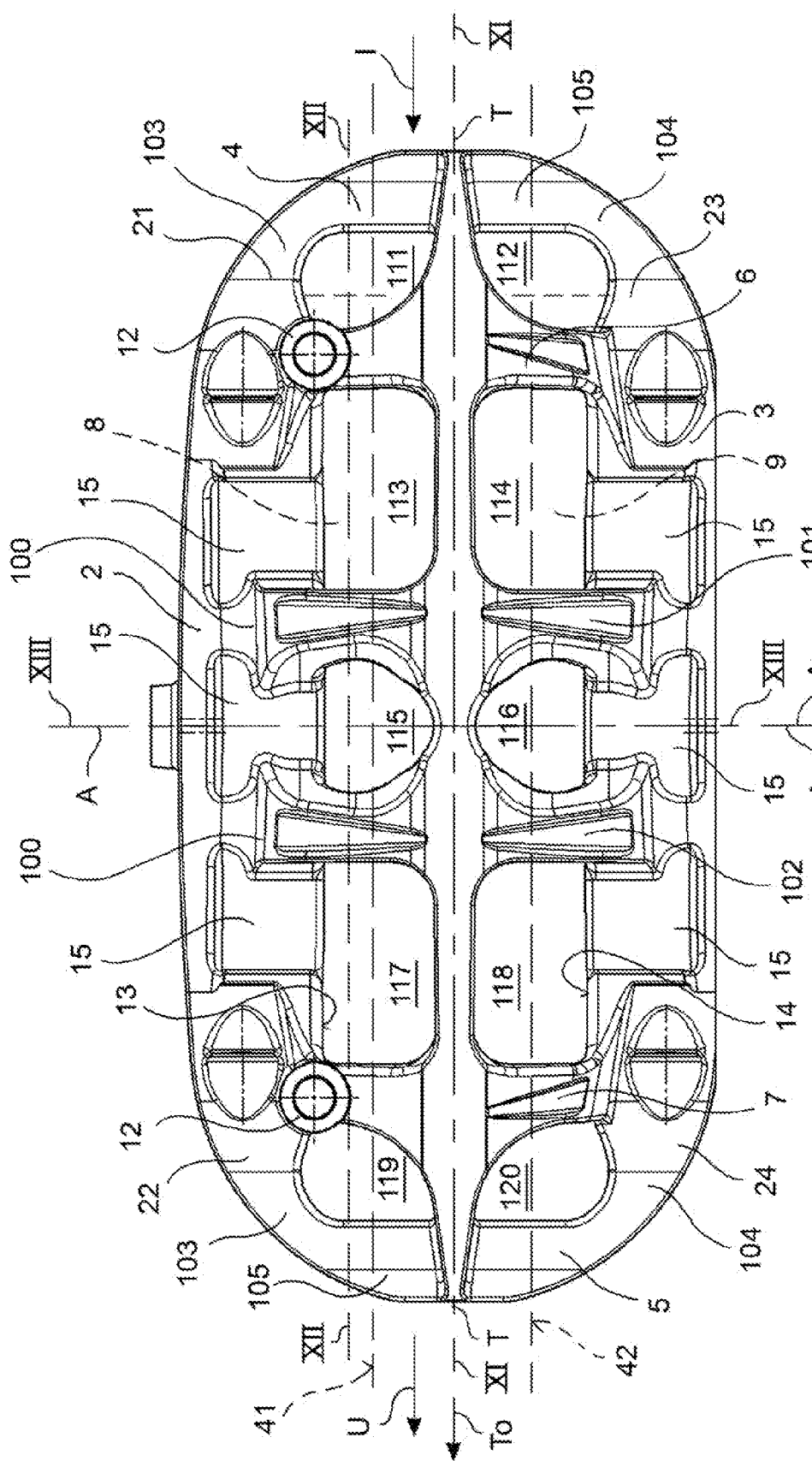
FIG. 7 shows a view from above, i.e. representing the radially outer surface facing the opposite side to the disc, of the caliper of FIG. 1.

In accordance with a general embodiment, a few examples of which are depicted in the attached figures, a caliper body 1 for a disc brake is suitable for being arranged astride of a disc 40 for a disc brake.

Said disc 40 has a first braking surface 41 and a second braking surface 42, opposite the first braking surface. The disc 40 defines an axial direction, indicated in the figures with the axis A-A, parallel to a rotation axis thereof, indicated in the figures with a-a, as well as a tangential or circumferential direction, indicated in the figures with T-T and parallel to one of its braking surfaces 41, 42. When this circumferential direction is followed in the same direction as the rotation of the disc, a disc-entry travel direction is defined, indicated in the figures with reference letter "I", as well as defining an opposite disc exit direction indicated in the figures or in the references with "U".

Said disc 40 also defines a radial direction, indicated in the figures with R-R, arranged perpendicular to the axial direction A-A and to the circumferential or tangential direction T-T. Also for the radial direction it is possible to define a radial outward direction RO when this direction is followed away from the rotation axis of the disc a-a.

The caliper body 1 comprises a mounting-side elongated portion 2, equipped with at least one mounting portion 12, for example but not necessarily a portion defining a through-hole suitable for receiving means for fixing the caliper body to a support structure of the caliper body, for example a stub axle of a suspension of a vehicle.

Said mounting-side elongated portion 2 comprises a disc entry-side first tangential end 21 and a disc exit-side second tangential end 22.

Said mounting-side elongated portion 2 has an axial inner surface thereof 13 suitable for facing the first braking surface 41 of the disc 40.

Said mounting-side elongated portion 2 houses, or forms, at least two cylinders 15, advantageously but not necessarily three cylinders 15, suitable for each receiving a pressure on a pad 8 arranged, or housed, between said elongated mounting portion 2 and said braking surface 41 of the disc 40.

Said caliper body 1 also comprises a non mounting-side elongated portion 3. Said non mounting-side elongated portion 3 has an axial inner surface 14 suitable for facing the second braking surface 42 of the disc 40. Said non mounting-side elongated portion has a disc entry-side first tangential end 23 and a disc exit-side second tangential end 24.

Said non mounting-side elongated portion 3 houses, or forms, at least two cylinders 15, preferably but not necessarily three cylinders 15, suitable for each receiving a piston to exert a pressure on a pad 9 housed between said non mounting-side elongated portion 3 of the caliper 39 and said braking surface 42 of the disc 40.

Said elongated portions 2, 3 are connected together by a first end bridge 4 that connects the two disc entry-side tangential ends 21, 23 of the elongated mounting portion and of the elongated non mounting portion 3. Advantageously, said bridge is suitable for being arranged astride of the disc 40.

In accordance with an embodiment, said end bridge 4 has a band-like or substantially flat body.

Said elongated portions 2, 3 are also connected together by a second end bridge 5 that connects them at the two disc exit-side tangential ends 22, 24. Said second end bridge 5 is suitable for being arranged astride of the disc 40.

In accordance with an embodiment, said end bridge 5 has a band-like or substantially flat body.

Preferably, said caliper body 1 also comprises three further bridges, a central bridge 100, advantageously but not necessarily two central or middle bridges 101 and 102, and two intermediate bridges 6, 7 connecting the two elongated mounting and non mounting portions 2, 3 in their regions arranged inside or between the two end bridges, or else inside the disc entry-side first tangential end and the disc exit-side second end.

In accordance with an embodiment, said mounting-side and non mounting-side elongated portions 2, 3 are connected together by at least two bridges 5 and 7 or else 4 and 6 arranged circumferentially or tangentially outside the cylinders 15. In accordance with an embodiment, said mounting-side and non mounting-side elongated portions 2,3 are connected together at both the disc entry and exit ends 21, 22, 23 and 24 by at least two bridges 5, 7 and 4, 6 for each end.

In accordance with an embodiment, there are at least two bridges 4, 6 or 5, 7 connecting the elongated portions 2, 3 arranged outside the at least two cylinders 15 foreseen in the elongated portions 2, 3, avoiding the presence of any cylinder 15 between these two bridges.

In accordance with an embodiment, each of said bridges 6, 7, 100 connects to said elongated portions at the side of said cylinders 15. In other words every bridge, at least those centrally arranged between said end bridges 4,5, connects to the elongated portion where it comprises a cylinder 15 and in particular on a side of a cylinder, for example engaging, in a radial view, at most half of the cylinder. In other words, the connection portion between a bridge 6, 7, 100 and the elongated portion comprising a cylinder 15 engages at most half of the body portion that forms the wall that defines a cylinder 15.

In accordance with an embodiment, each of said bridges 6, 7, 100 connects to said elongated portions at the side of said cylinders 15 so as not to radially cover more than half the cylinder.

Thanks to a connection between a bridge and the elongated portion that is limited to the side of a cylinder, it is possible to leave at least one portion of an elongated element free, in particular a portion of the wall that defines a free cylinder, so as to facilitate the cooling of the wall that defines the chamber that receives the brake fluid for thrusting pistons received in said cylinder.

In accordance with an embodiment, between said at least two cylinders for an elongated portion there are two bridges 101, 102. In accordance with an embodiment, between said two bridges 101, 102 the presence of a cylinder is avoided. In accordance with an embodiment, said two bridges 101, 102 are adjacent without the interposition of cylinders.

In accordance with an embodiment, between said bridges 6, 7, 100 or 101 and 102 there is at least one through-window that places the inside of the caliper 39 in communication in the radial direction R-R with the outside of the caliper.

In accordance with an embodiment, between said end, intermediate and central bridges 4, 5; 6, 7; 100 or 101, 102 there is at least one window 111, 112; 113, 114; 115, 116; 117, 118; 119, 120 that places the inside of the caliper in communication in the radial direction R-R with the outside of the caliper.

In accordance with an embodiment, between said end, intermediate and central bridges 4, 5; 6, 7; 100 or 101, 102 there is at least one further transversal bridge arranged in the tangential direction, preferably, but not necessarily, arranged in the middle of the caliper body that connects in pairs the adjacent bridges and defines at least two windows 111, 112; 113, 114; 115, 116; 117, 118; 119, 120 between each pair of adjacent bridges that place the inside of the caliper in communication in the radial direction R-R with the outside of the caliper.

In accordance with an embodiment, between said end, intermediate and central bridges 4, 5; 6, 7; 100 or 101, 102 there is at least one window 111, 112; 113, 114; 115, 116; 117, 118; 119, 120 that places the non mounting side of the caliper in communication in the axial direction A-A with the mounting side of the caliper.

In accordance with an embodiment, between said end, intermediate and central bridges 4, 5; 6, 7; 100 or 101, 102 there is at least one further transversal bridge arranged in the tangential direction, preferably, but not necessarily, arranged in the middle of the caliper body that connects in pairs the adjacent bridges and defines at least two windows 111, 112; 113, 114; 115, 116; 117, 118; 119, 120 between each pair of adjacent bridges that place the non mounting side of the caliper in communication in the axial direction A-A with the inside of the caliper and thus with the mounting side of the caliper.

Figure 8:
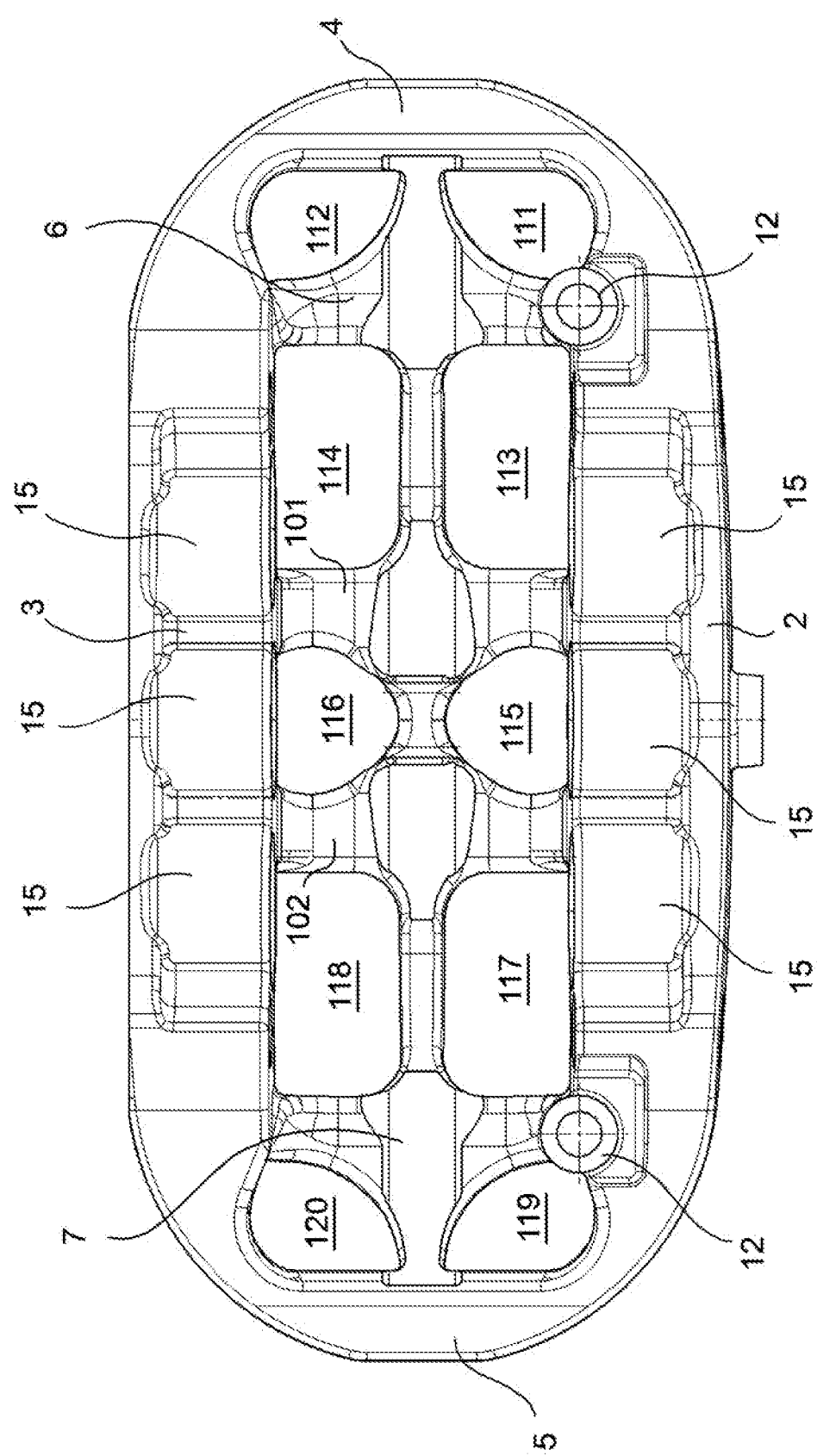
FIG. 8 illustrates a view from below, i.e. representing the radially inner surface facing towards the disc, of the caliper of FIG. 1.
Figure 9:
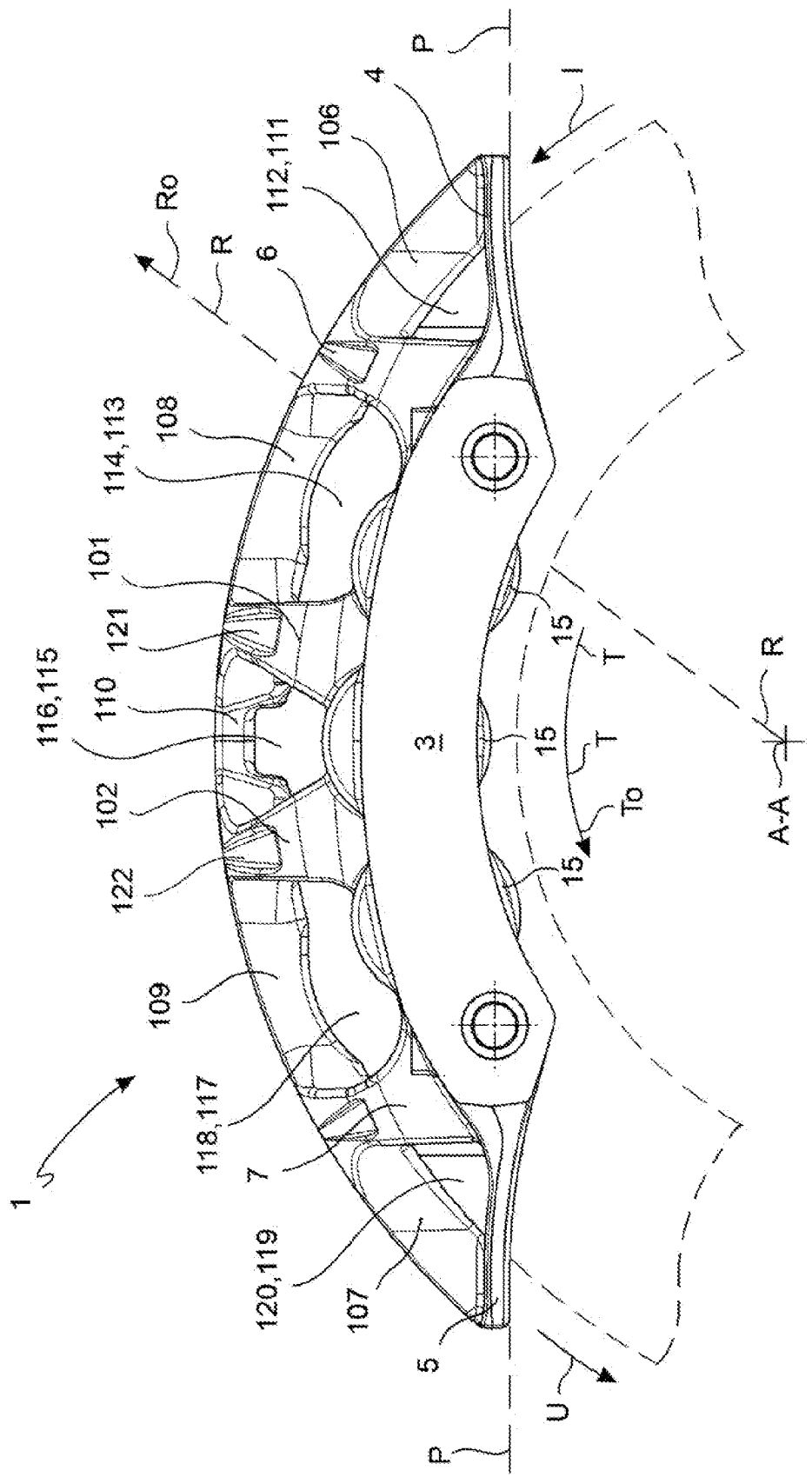
FIG. 9 illustrates an axially outer side view or from the elongated element side, wheel side, or non-mounting side, of the caliper of FIG. 1.
Figure 10:
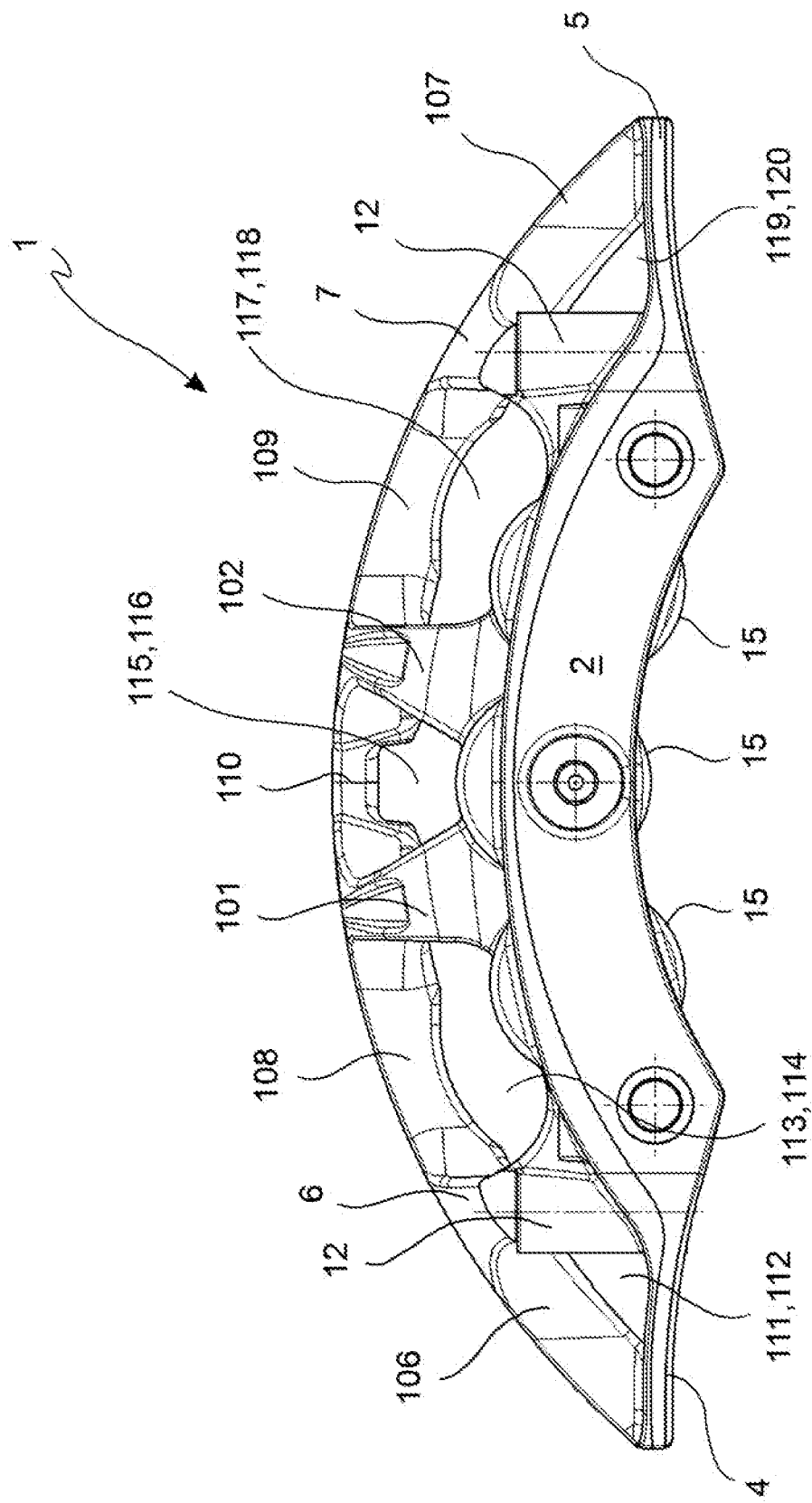
FIG. 10 illustrates an axially inner side view or from the elongated element side on the mounting side, of the caliper of FIG. 1.
Figure 11:
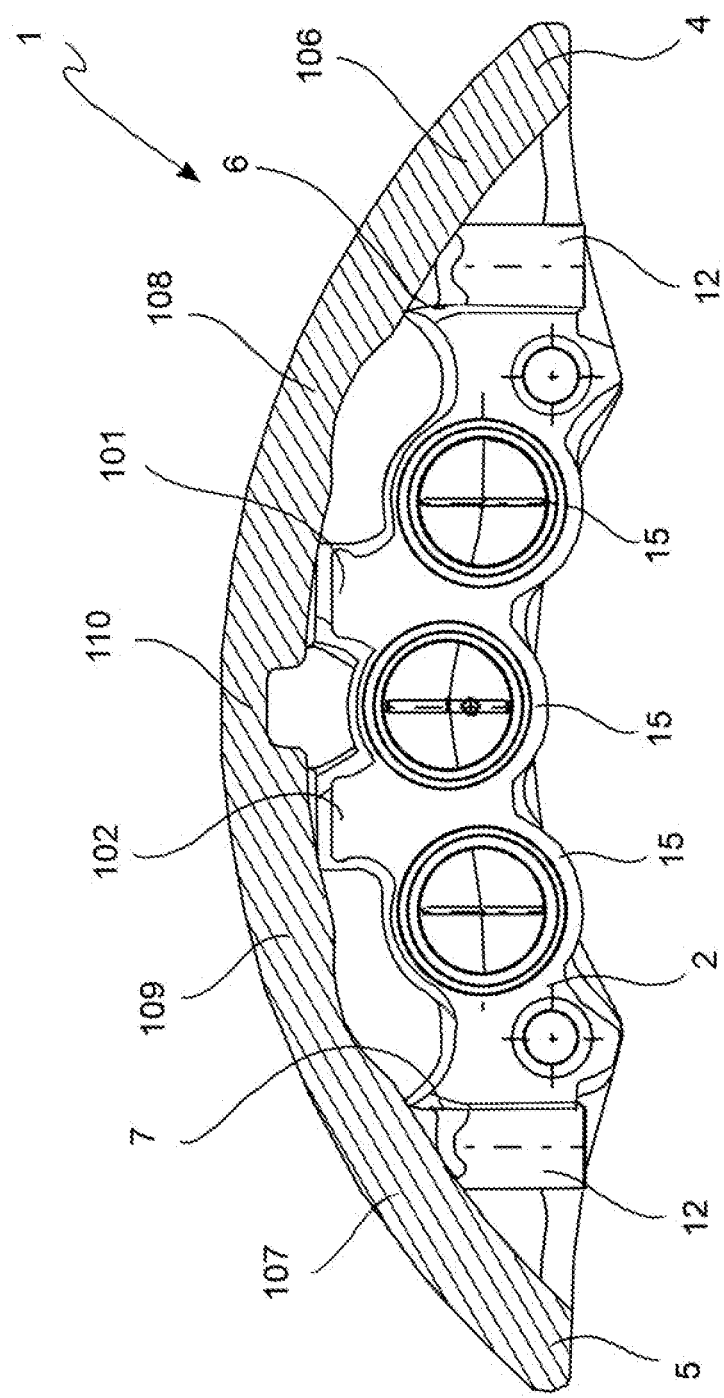
FIG. 11 illustrates a section along the tangential line XI-XI of FIG. 7 of the caliper of FIG. 1.
Figure 12:
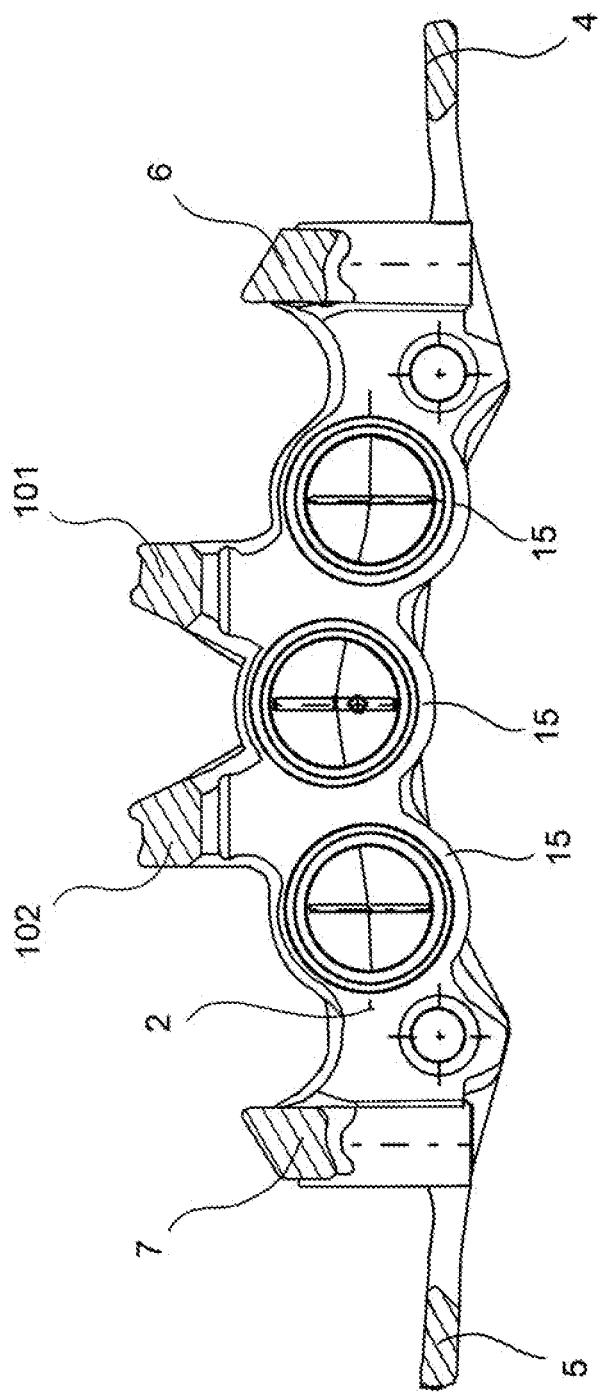
FIG. 12 illustrates a section along the tangential line XII-XII of FIG. 7 of the caliper of FIG. 1.
Figure 13:
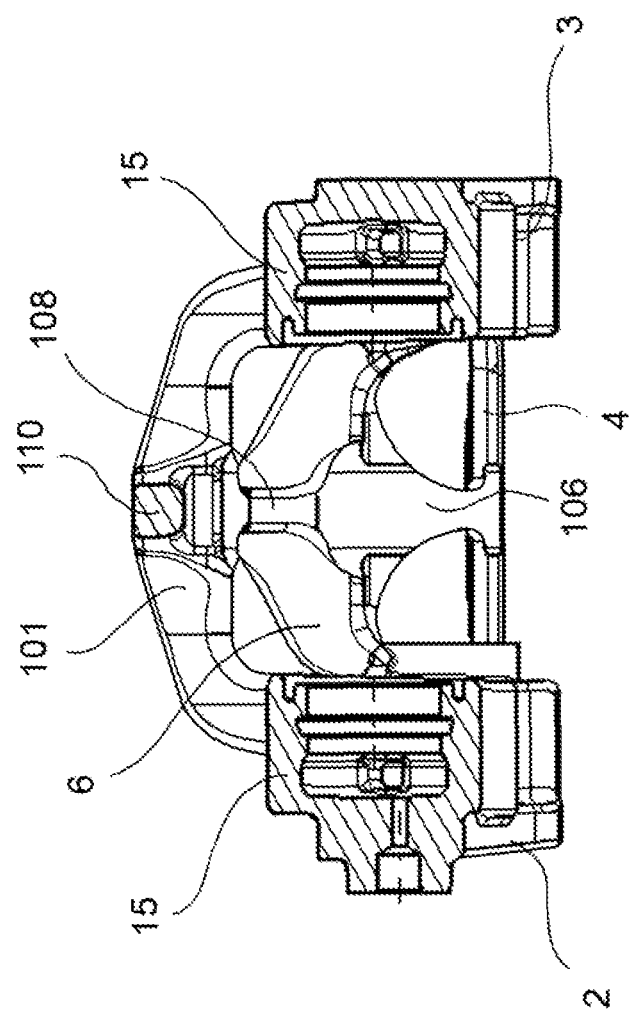
FIG. 13 shows a section along the line XIII-XIII of FIG. 7 of the caliper of FIG. 1.
Figure 14:
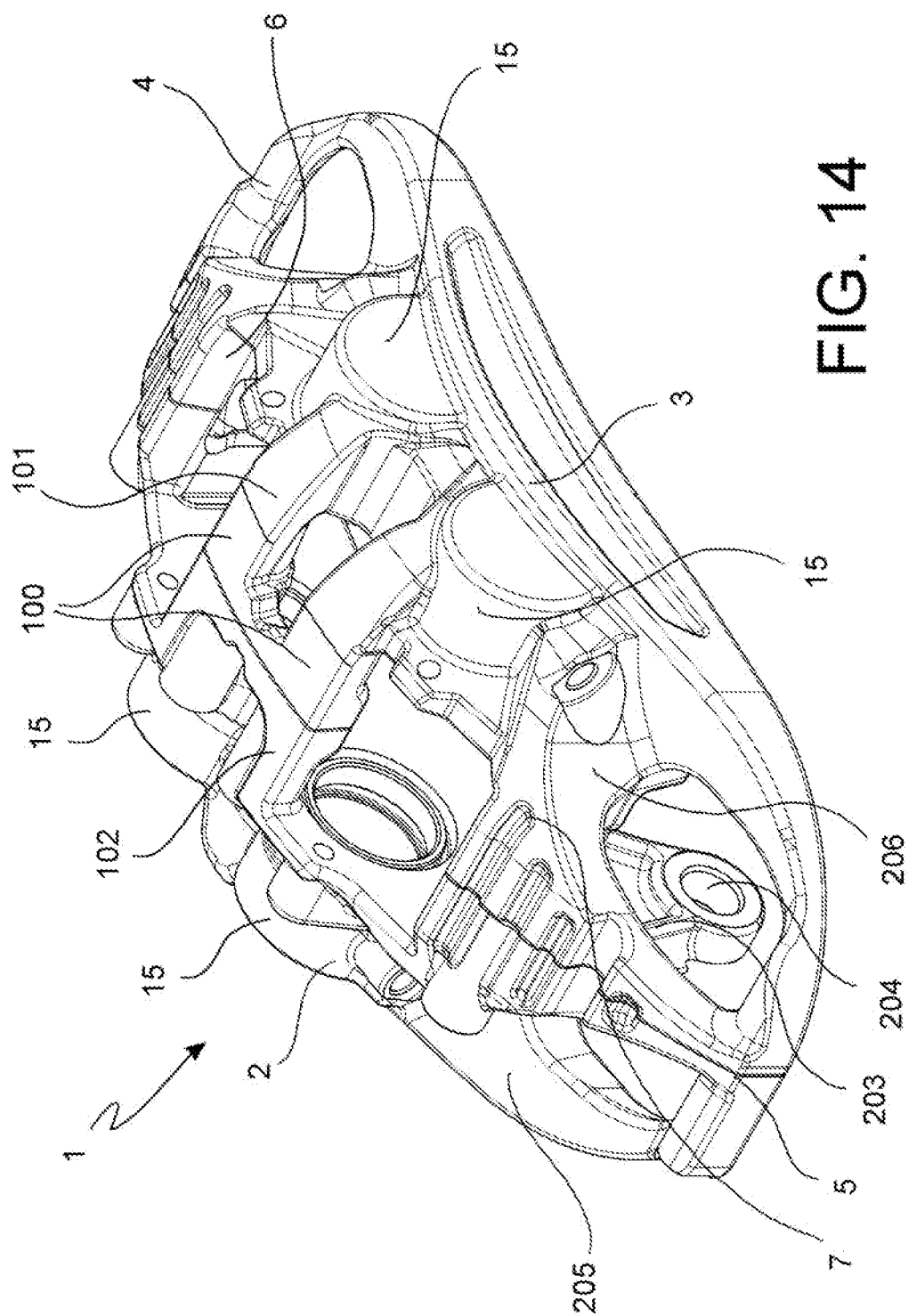
FIGS. 14 to 22 show axonometric and perspective views, as well as axonometric views with separated parts, of a caliper according to a further embodiment.
Figure 15:
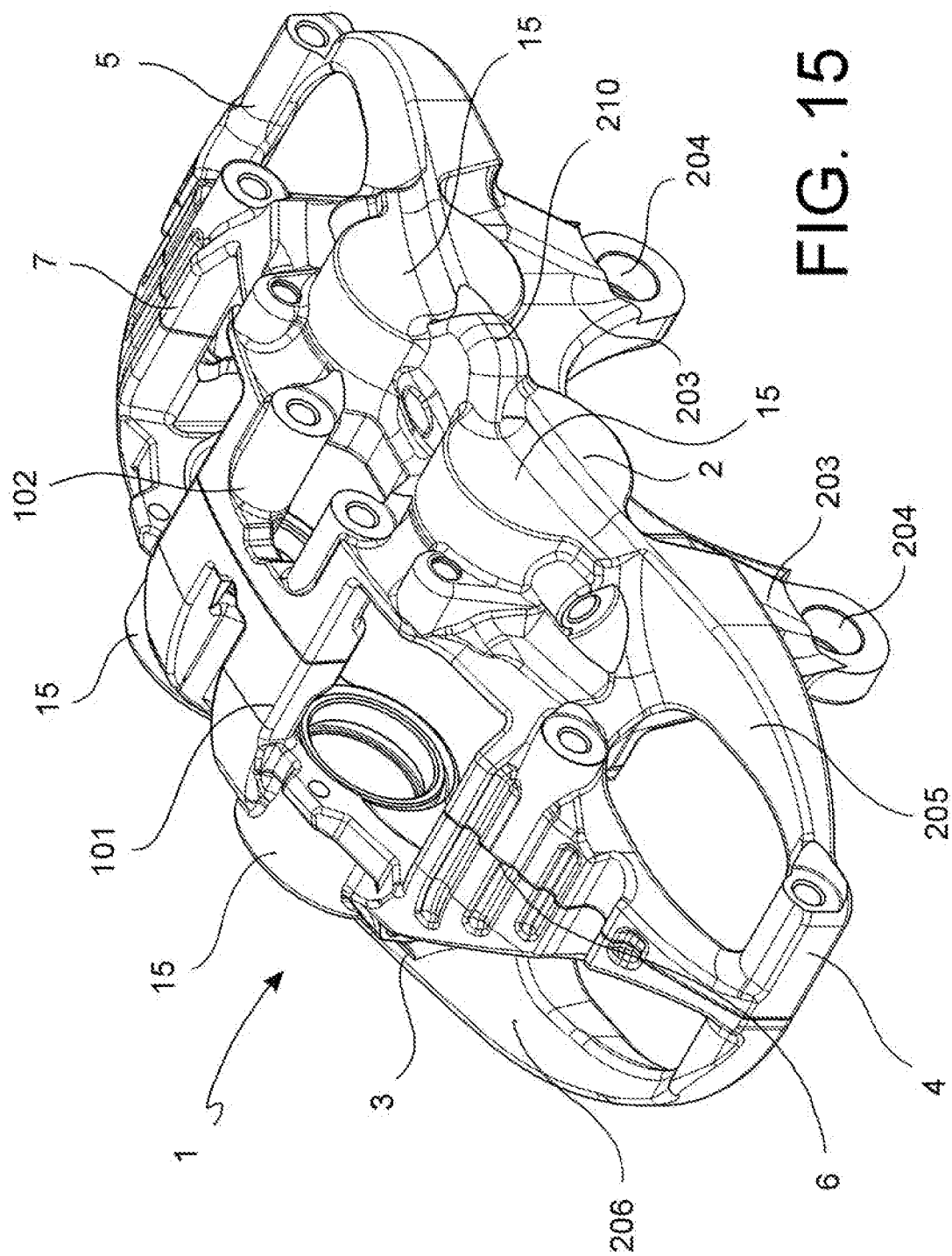
Figure 16:
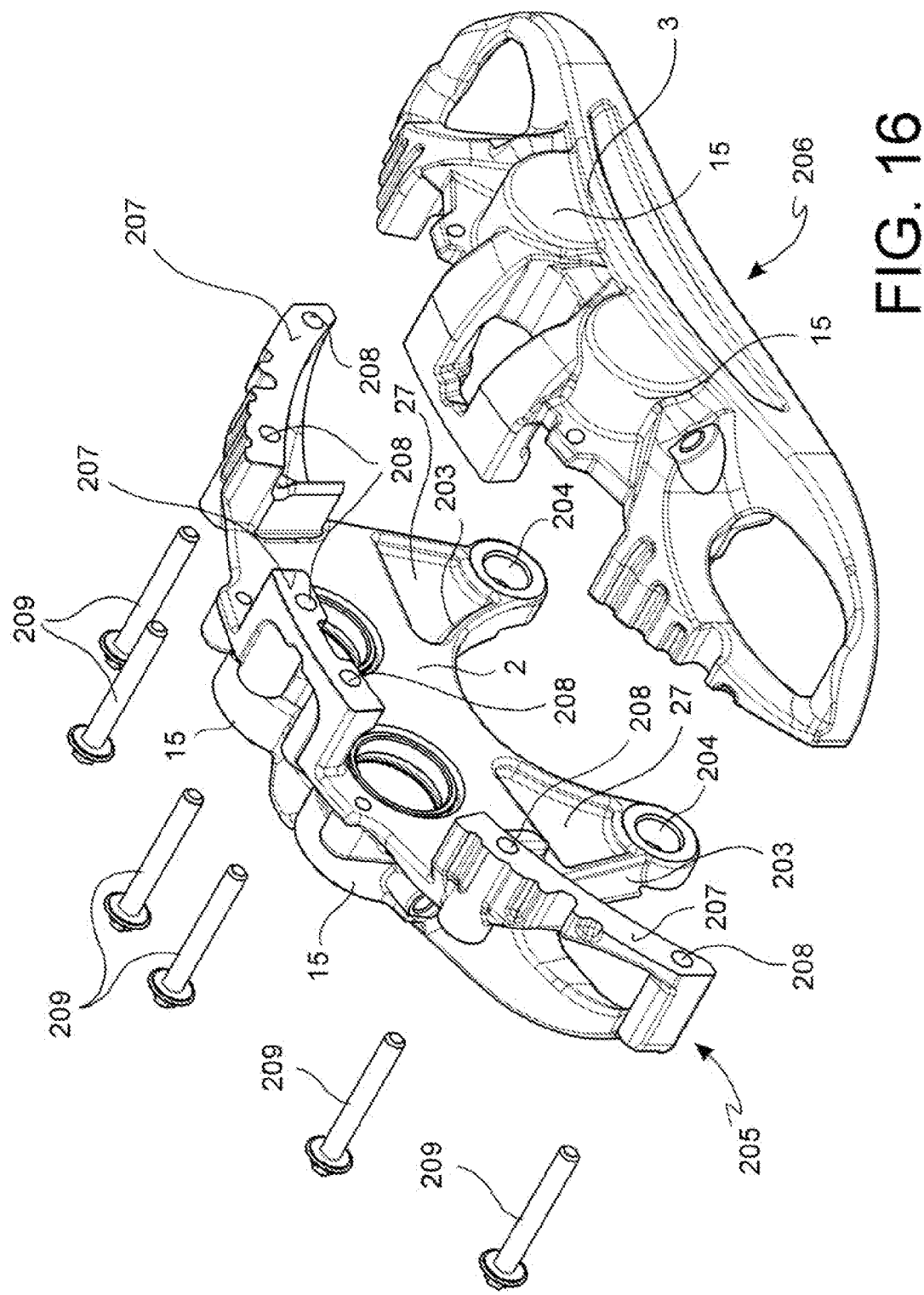
Figure 18:
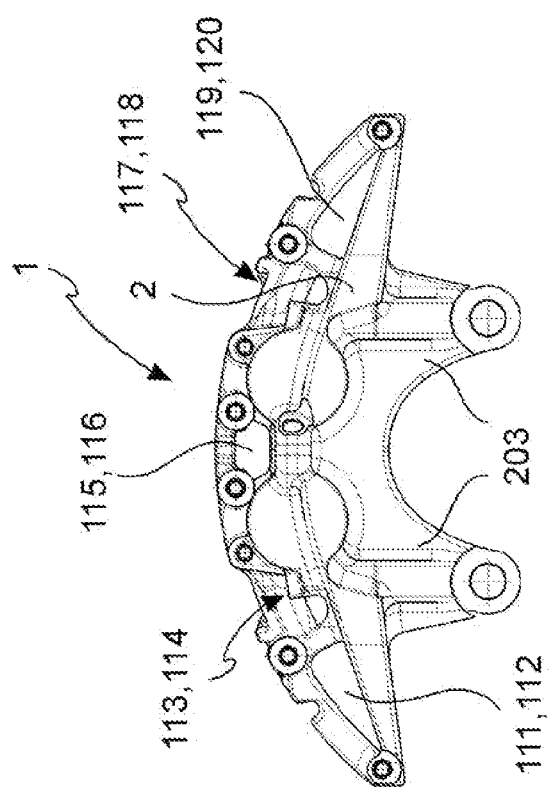
Figure 17:
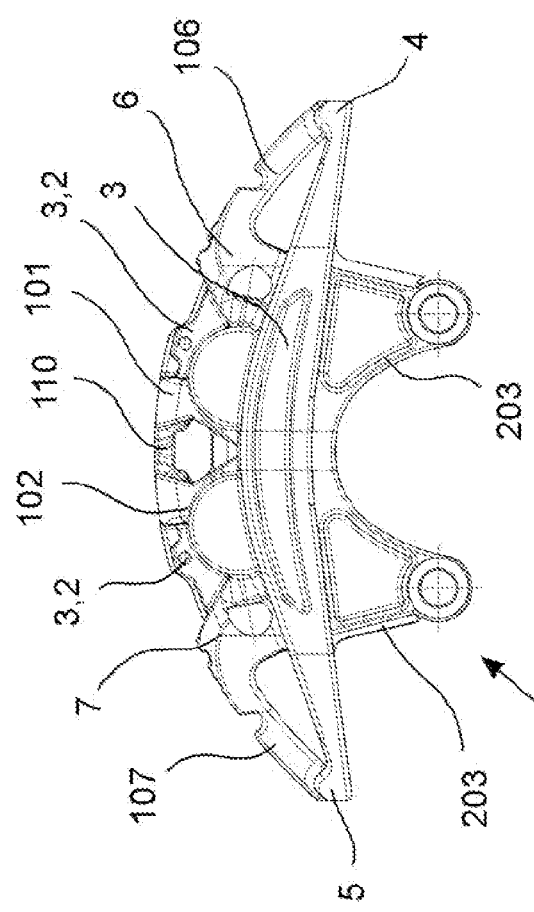
Figure 20:
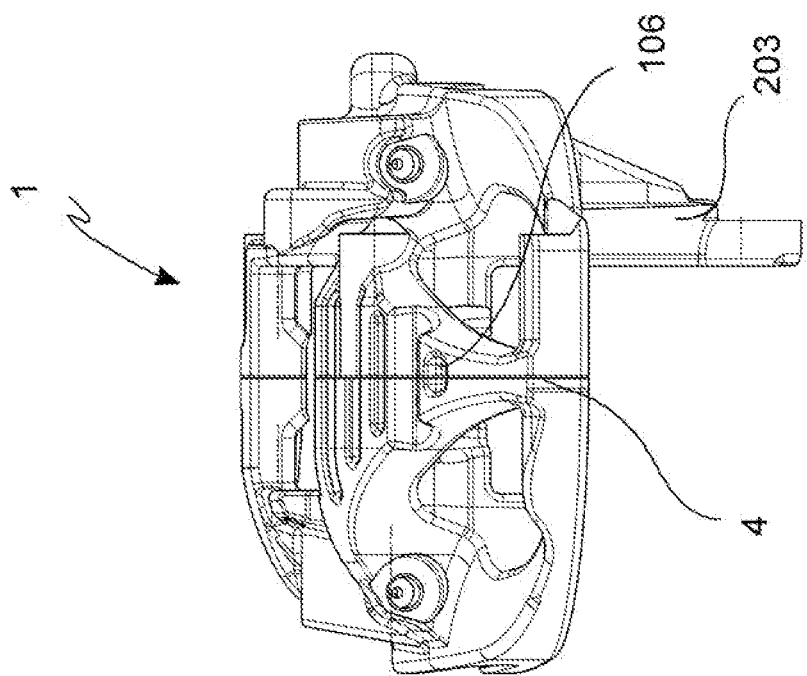
Figure 19:
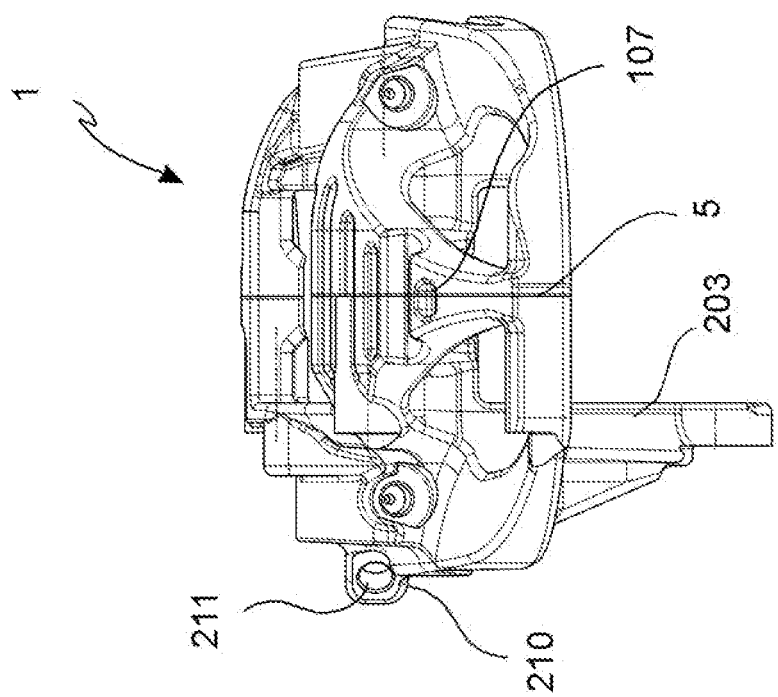
Figure 22:
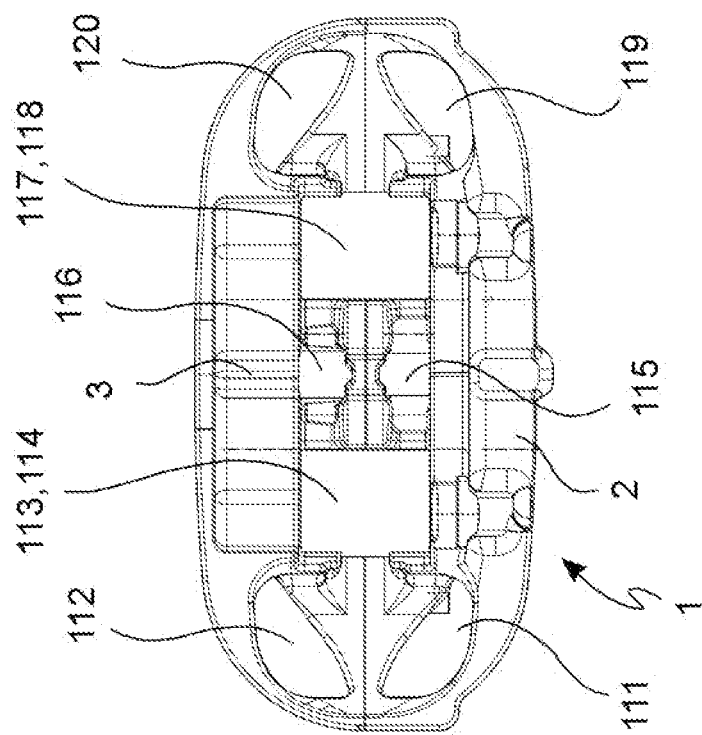
Figure 21:
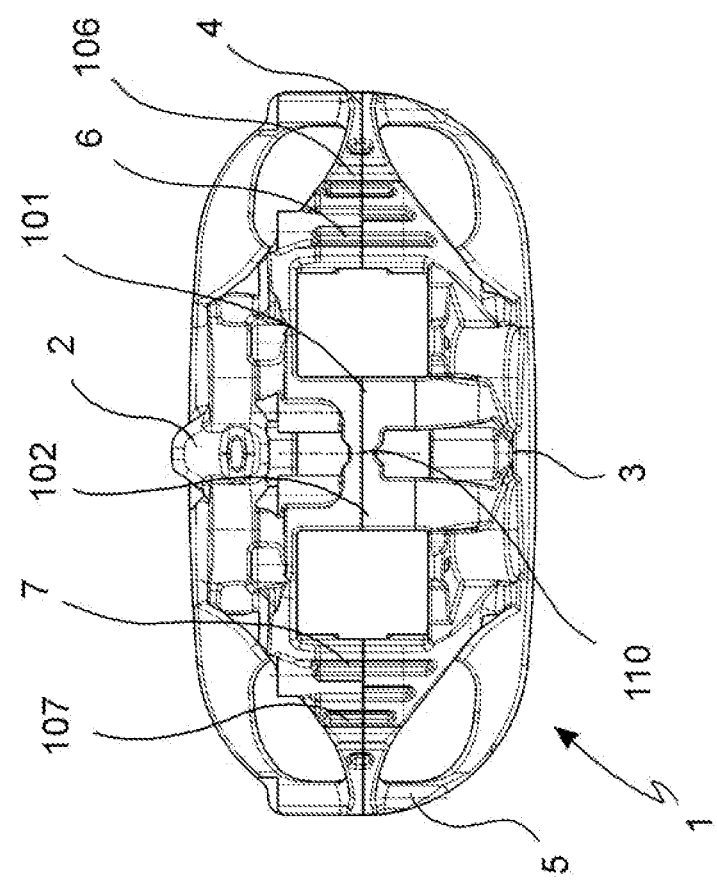

In accordance with an embodiment, the non mounting side and mounting side elongated bodies 3, 2 define pockets 27 suitable for receiving the pads 8, 9 so that they are arranged between the pistons housed in the cylinders 15 and the braking surfaces 41, 42 of the disc 40 (FIG. 8).

In accordance with an embodiment the thickness evaluated in the tangential direction T-T of the central or middle bridges 101 and 102 is variable along the longitudinal or axial direction A-A of said central bridges 101, 102.

In accordance with an embodiment, at least one of the central bridges 6, 7 has a portion thereof close to the non mounting-side elongated element 3 equipped with a lightening undercut or groove 121 and 122.

In accordance with an embodiment both of the central bridges 6, 7 have a portion close to the non mounting-side elongated element 3 equipped with a groove, for example but not necessarily longitudinal, or directed in the axial direction A-A, for lightening 121 and 122.

In accordance with an embodiment, the mounting-side and non mounting-side elongated portion 4, 3 have a longitudinal portion thereof extending according to the tangential direction T-T that is outside with respect to the body of the caliper 1, or on the opposite side with respect to the disc 40, with a low thickness or smaller than the thickness at the mounting points between the mounting-side and non mounting-side elongated portion 2, 3 and the end bridges 4, 5, as well as the intermediate and central bridges 6, 7; 101, 102.

In accordance with an embodiment, the mounting-side elongated portion 2 and the non mounting-side elongated portion 3, between at least one intermediate bridge 6, 7 and at least one central bridge 101, 102 have at least two recessed or undercut portions forming portions of said mounting-side elongated portion 2 and said non mounting-side elongated portion 3 with low thickness or smaller than the radial thickness evaluated at said intermediate bridge 6, 7 and said central bridge 101, 102.

In accordance with an embodiment, in said mounting-side elongated portion 2 and in said non mounting-side elongated portion 3, there are at least one window that opens in the axial direction A-A arranged between at least one bridge and the adjacent bridge, said window placing the inside of the body of the caliper, or a plate of the pad 8, in communication in the axial direction with the outside of the caliper.

In accordance with an embodiment, said there are five of said axial windows in the section of the elongated mounting-side element 2 and there are five of said axial windows in the section of the non mounting-side elongated element 3.

In accordance with an embodiment, the non mounting-side elongated element 3 has a radial thickness outside of the shape of the cylinders that remains substantially constant along its entire longitudinal extension or parallel to the circumferential direction T-T.

In accordance with an embodiment, said non mounting-side elongated element 3 extends outside of the shape of the cylinders with a constant thickness forming an arc of circle-shaped portion, from which, for example, but not necessarily, at the bottom, i.e. in its side facing towards the axis of the disc a-a, portions project at the cylinders 15 to house the pistons for biasing the pad 9. In accordance with an embodiment, every undercut portion or axial window of the mounting-side elongated portion 2 is axially faced by a portion of similar radial thickness of the non mounting-side elongated portion 3.

In accordance with an embodiment, the mounting-side elongated portion 2 has an upper surface thereof facing radially outwards with respect to the axis of the disc a-a, which is shaped following the profile of the cylinders 15 that are made in it, forming for example recessed and projecting loops.

In accordance with an embodiment, the mounting-side elongated portion 2 has a lower surface thereof facing radially inwards towards the axis of the disc a-a, shaped following the profile of the cylinders that are made in it, forming for example recessed and projecting loops. In accordance with an embodiment the mounting portions 12 foreseen in the mounting-side elongated portion 2 of the caliper 39 are two in number, or, alternatively, but not necessarily, there are four of them, where two of said four mounting portions 12 are preferably, but not necessarily arranged close to the intermediate bridges 6, 7.

Thanks to the fact that the mounting portions 12 are foreseen in accordance with an embodiment, close to the intermediate bridges 6, 7 all of the stresses coming from the non mounting-side elongated portion 3 are transferred to the support of the caliper passing through the intermediate bridges 6, 7 coming together directly through the mounting portions 12 to the connection means and to the support of the caliper, limiting the deformation of the body of the caliper 1.

In accordance with an embodiment, said non mounting-side elongated portion 3 has a radially upper surface facing in the radial outward direction away from the axis of the disc a-a and is shaped so as to follow the progression of the cylinders 15 foreseen in said non mounting-side elongated portion 3, forming for example recessed or projecting loops.

In accordance with an embodiment, said non mounting-side elongated portion 3 has an inner radial surface facing towards the axis of the disc a-a, shaped so as to follow the profile of the cylinders 15, foreseen in said non mounting-side elongated portion 3, forming for example recessed or projecting loops.

In accordance with an embodiment, a caliper body 1 for a disc brake is suitable for being arranged astride of a disc 40 for a disc brake. Said disc 40 comprises a first braking surface 41 and a second braking surface 42 opposite the first. Said disc 40 defines an axial direction A-A parallel to a rotation axis thereof a-a, the latter defining an axial outward direction AO when facing away from the vehicle, a tangential or circumferential direction T-T parallel to one of its braking surfaces, the latter defining an outward tangential direction TO when facing away from the caliper body, with disc entry direction I and disc exit direction U, and a radial direction R-R perpendicular to the axial direction A-A and to the circumferential or tangential direction T-T, the latter defining a radial outward direction RO when facing away from the rotation axis of the disc.

Said caliper body comprises a mounting-side elongated portion 2 equipped with at least one mounting portion 12 suitable for being connected to a support for the caliper. Said mounting-side elongated portion 2 comprises a disc entry-side first tangential end 21 and a disc exit-side second tangential end 22. Said mounting-side elongated portion 2 is suitable for facing with an axial inner surface thereof 13 towards the first braking surface 41 of the disc. Said body also comprises a non mounting-side elongated portion 3 facing with an axial inner surface thereof 14 towards the second braking surface 42 of the disc and comprises a disc entry-side first tangential end 23 and a disc exit-side second end 24. Each elongated portion 2, 3 houses or forms at least two cylinders 15 each suitable for receiving a piston to exert a pressure on at least one pad 8, 9 housed between said elongated portion 2, 3 of the caliper 1 and said braking surface 41, 42 of the disc 40. Said elongated portions 2, 3 are connected together by a first end bridge 4 that connects the two disc entry-side tangential ends 21, 23. Said bridge is suitable for being arranged astride of the disc. Said elongated portions 2, 3 are connected by a second end bridge 5 that connects the two disc exit-side tangential ends 22, 24, said second bridge being suitable for being arranged astride of the disc. Said caliper body also comprises at least three central bridges at the end bridges 6, 7, 100 connecting the two elongated portions 2, 3 in their regions arranged inside the two end bridges 4, 5. Each of said central bridges 6, 7, 100 connects to said elongated portions at the side of said at least two cylinders 15 forming at least four through-windows in said caliper body 1.

In accordance with an embodiment, said caliper body 1 comprises four central bridges 6, 7, 101, 102, in particular two intermediate bridges 6, 7 and two middle or central bridges 101, 102, said bridges being arranged in to connect the two elongated portions 2, 3 in their regions arranged inside the two end bridges 4, 5. Each of said central bridges 6, 7, 101, 102 at the end bridges connects to said elongated portions at the side of a cylinder 15, preferably three cylinders 15 foreseen for each elongated portion 2, 3, together with the elongated portions 2, 3 forming at least five windows 111, 113, 115, 117, 119 passing through said caliper body 1.

In accordance with an embodiment, each bridge 4, 5, 6, 7, 101, 102 connecting between said elongated portions 2, 3 comprises
a first joining portion 103 joined to the mounting-side elongated portion 2 arranged substantially in the radial direction R-R,
a second joining portion 104 joined to the non mounting-side elongated portion 3 arranged substantially in the radial direction R-R,
a third bridge portion 105 joined to the first joining portion 103 and to the second joining portion 104 and arranged substantially in the axial direction A-A.

Said portions 103, 104 and 105 configuring the bridge substantially in a "U" (in the figures in an inverted "U") suitable for being arranged astride of the disc 40. In accordance with an embodiment, at least two bridges 4, 5, 6, 7, 101, 102 are connected to the adjacent bridge through a further bridge transversal to it or tangential bridge 106, 107, 108, 109, 110 that, between the bridge and the adjacent bridge, defines two windows 111, 112; 113, 114; 115, 116; 117, 118; 119, 120 passing through the body of the caliper 1.

In accordance with an embodiment, between a disc entry bridge 4 and an adjacent intermediate bridge 6 there is an entry-side tangential bridge 106 that forms a mounting-side disc entry bridge window 111 and a non mounting-side disc entry bridge window 112.

In accordance with an embodiment, said entry-side tangential bridge 106 is substantially V-shaped when observed in the radial direction. In accordance with an embodiment, said entry-side tangential bridge 106 is substantially V-shaped with rounded edges. In accordance with an embodiment, said entry-side tangential bridge 106 has, for example radially outside, grooves 201, for example but not necessarily extending in the axial direction A-A, for example but not necessarily a plurality of grooves 201 that are parallel to one another.

In accordance with an embodiment, between the intermediate bridge 6 and an adjacent central bridge 101 there is an intermediate tangential bridge 108 that forms a window between intermediate bridge and central bridge on the mounting side 113 and a window between intermediate bridge and central bridge on the non mounting side 114.

In accordance with an embodiment, between the central bridge 101 and an adjacent further central bridge 102 there is a central tangential bridge 110 that forms a window between central bridge and central bridge on the mounting side 115 and a window between central bridge and central bridge on the non mounting side 116.

In accordance with an embodiment, between the central bridge 102 and an adjacent intermediate bridge 7 there is an intermediate tangential bridge 109 that forms a window between central bridge and intermediate bridge on the mounting side 117 and a window between central bridge and intermediate bridge on the non mounting side 118.

In accordance with an embodiment, between the intermediate bridge 7 and an adjacent disc exit-side end bridge 5 there is a tangential end bridge 107 that forms a window between intermediate bridge and disc exit-side bridge on the mounting side 119 and a window between intermediate bridge and disc exit-side bridge on the non mounting side 120.

In accordance with an embodiment, said exit-side tangential bridge 107 is substantially V-shaped when observed in the radial direction. In accordance with an embodiment, said exit-side tangential bridge 107 is substantially V-shaped with rounded edges. In accordance with an embodiment, said exit-side tangential bridge 107 has, for example radially on the outside, grooves 201, ad for example but not necessarily extending in the axial direction A-A, for example but not necessarily a plurality of grooves 201 that are parallel to one another.

In accordance with an embodiment, two adjacent bridges 4, 6; 6, 101; 101, 102; 102, 7; 7, 5 define a through-window 120 and 119; 118 and 117; 116 and 115; 114 and 113; 112 and 111 that crosses the caliper body 1 in the axial direction A-A.

In accordance with an embodiment, said end bridges 4 and 5 have a foil-shaped bridge body that lies substantially parallel to a plane P.

In accordance with an embodiment, the end bridges 4 and 5 lie substantially parallel to the same plane P and advantageously are aligned with one another.

In accordance with an embodiment, said mounting-side elongated portion 2 and said non mounting-side elongated portion 3 extend in the tangential direction T-T substantially in an arc of circle housing or forming the cylinders 15. In accordance with an embodiment, said cylinders project from said mounting-side elongated portion 2 and said non mounting-side elongated portion 3 in the radial outward direction RO and in the opposite radial direction.

In accordance with an embodiment, said non mounting-side elongated portion 3 externally or axially externally has a groove 201 extending tangentially.

In accordance with an embodiment, said mounting-side elongated portion 2 has at least one, preferably two, connection brackets 203 for the connection of the caliper to a stub axle. In accordance with an embodiment, said connection brackets 203 extend in a substantially radial direction and, for example but not necessarily, at the end form seats 204 for the connection of the caliper to the stub axle, for example but not necessarily, seats extending in a substantially axial direction.

In accordance with an embodiment, two central bridges 101 and 102 are connected together by a central tangential bridge 110 directed tangentially T-T and together with said central bridges 101, 102 defining two through-windows 115, 116 that in the radial direction R-R have an edge curved in a bulb.

In accordance with an embodiment, between two central bridges 101, 102 and the two intermediate bridges 6, 7 there is a tangential bridge directed tangentially T-T that together with said central and intermediate bridges 101, 102; 6, 7 defines two through-windows 113, 114; 117, 118 that in the radial direction R-R have a U-shaped edge with a flat base towards the elongated body 2, 3.

In accordance with an embodiment, between the two intermediate bridges and the two end bridges there is a tangential bridge directed tangentially T-T that together with said intermediate and end bridges 6, 7; 4, 5 defines two through-windows 111, 112; 119, 120 that in the radial direction R-R have a triangular edge with the side facing the edge of the intermediate bridge curved towards the end bridges.

In accordance with an embodiment, said intermediate bridges 6, 7 house or form mounting portions 12 of the caliper body to the stub axle.

In accordance with an embodiment, said central bridges 101 and 102 have a portion that projects to the non mounting-side elongated portion 3 with a radially outer surface in which a lightening groove 121, 122 is formed. In accordance with an embodiment, said mounting-side and non mounting-side elongated portions 2, 3 each house or form three cylinders 15 and are connected together by six bridges 4, 5, 6, 7, 101, 102 and each pair of adjacent bridges is connected by tangential bridges 106, 107, 108, 109, 110, defining ten through-windows in the radial direction to the caliper body.

In accordance with an embodiment, said mounting-side and non mounting-side elongated portions 2, 3 each house or form three cylinders 15 and are connected together by six bridges 4, 5, 6, 7, 101, 102 and each pair of adjacent bridges is connected by tangential bridges 106, 107, 108, 109, 110, defining ten through-windows in the axial direction to the caliper body.

In accordance with an embodiment, said caliper body 1 is a monoblock or a body in a single piece.

In accordance with an embodiment, said caliper body is formed from two half-bodies 205 and 206.

In accordance with an embodiment, said caliper in two half-bodies 205 and 206 has a connection plane 207 that for example but not necessarily, coincides with the middle of the caliper or preferably, but not necessarily, with an end of an elongated element.

In accordance with an embodiment, said two half-bodies have seats 208 that can be aligned with each other, for example for the connection of the two half-bodies with screws 209, for example stud bolts received in threaded seats of one of the two half-bodies.

In accordance with an embodiment, said seats 209 are obtained at the bridges 6, 7, 101, 102.

In accordance with an embodiment, one of the elongated portions, for example the mounting-side elongated portion 2, has a portion 210 suitable for the connection of a braking system to the brake fluid distribution ducts foreseen inside the caliper body. In accordance with an embodiment, said connection portion of the system 210 has an input 211 oriented axially or alternatively substantially in the tangential direction.

Thanks to the fact that some or all of the radial surfaces of the mounting-side elongated portions 2, and/or of the non mounting-side elongated portion 3 are shaped so as to follow the profile of the cylinders housed in them, it is possible to drastically reduce the thickness of said elongated portions 2, 3 and thus reduce the weight of the body of the caliper 1.

Thanks to the provision of inverted U-shaped bridges it is possible to drastically reduce the weight of the caliper and, at the same time, to drastically limit the deformation of the body of the caliper during the braking actions in both directions of travel of the vehicle.

Thanks to the provision of a caliper body as described above, it is possible to obtain a structure that is particularly resistant to the high stresses generated by sudden braking, for example like in racing vehicles.

At the same time, thanks to the characteristics of the caliper body described above, the caliper biased with the maximum braking will have an extremely small deformation that avoids undesired strokes of the brake pedal lever, giving the user the sensation of extremely good responsivity of the braking system.

At the same time, thanks to the caliper body as described above, the overall weight of the caliper is low.

For example, from a test carried out using a caliper made according to the state of the art and having the same number of cylinders as the solution described here, it was found that by measuring the rigidity of the caliper body evaluated based on the amount of fluid that the caliper absorbs at the maximum pressure of use on the vehicle, the caliper displays an increased rigidity of 2-4% and even of 8-9% with respect to a caliper not equipped with intermediate bridges and at least one central bridge, together with a weight reduction of about 5-8%.

Moreover, thanks to the caliper body as described above it is possible to substantially reduce the overall bulk without changing the characteristics of rigidity or the weight.

The man skilled in the art can bring modifications, adaptations and replacements of elements with other functionally equivalent ones to the embodiments of the device described above, in order to satisfy contingent requirements, without for this reason departing from the scope of the following claims. Each of the characteristics described as belonging to a possible embodiment can be made independently from the other embodiments described.

The invention claimed is:

1. A caliper body for a disc brake comprising:
   a mounting-side elongated portion equipped with at least one mounting portion configured for being connected to a support for the caliper,
   said mounting-side elongated portion comprising a first end and a second end;
      a non-mounting-side elongated portion comprising a first end and a second end,
   each elongated portion housing or forming at least two cylinders each configured for receiving a piston to exert pressure on at least one pad,
   said elongated portions being connected together by a first end bridge that connects the two first ends,
   said elongated portions being connected by a second end bridge that connects the two second ends,
      at least three central bridges connecting the two elongated portions between the two end bridges,
      each of said at least three central bridges connecting to said elongated portions at the side of said at least two cylinders, so as to radially cover no more than half the cylinder, and forming at least four windows passing through said caliper body;
   wherein at least two of said at least three central bridges are arranged lateral to the at least two cylinders such that there are no cylinders between these at least two central bridges.

2. The caliper body of claim 1 further comprising a further central bridge, so that at least said four central bridges are defined as two intermediate bridges and two middle bridges,
   said at least four central bridges being arranged so as to connect the two elongated portions between said first and second end bridges,
   wherein said caliper body also comprises a further cylinder, and wherein said two intermediate bridges and said two middle bridges form at least five windows passing through said caliper body.

3. The caliper body of claim 1, wherein each bridge of said at least three central bridges and said first and second end bridges comprises:
   a first joining portion joined to the mounting-side elongated portion arranged substantially in the radial direction (R-R),
   a second joining portion joined to the non-mounting-side elongated portion arranged substantially in the radial direction (R-R),
   a third bridge portion joined to the first joining portion and to the second joining portion and arranged substantially in the axial direction (A-A),
   wherein said first and second joining portions and said third bridge portion form a "U" shape.

4. The caliper body of claim 2, further comprising a plurality of tangential bridges, each tangential bridge connecting two adjacent central or end bridges so as to define between each tangential bridge and each of the two adjacent central or end bridges two through-windows through the caliper body.

5. The caliper body of claim 4, wherein said plurality of tangential bridges comprises:
   a first end tangential bridge, which is located between said first end bridge and an intermediate bridge
   so as to form a mounting-side first window and a non-mounting-side first window,
   a second end tangential bridge, which is located between said second end bridge and an intermediate bridge
   so as to form a mounting-side second window and a non-mounting-side second window;
      at least two intermediate tangential bridges, wherein each tangential bridge is located between each intermediate bridge and the adjacent middle bridge
   so as to form at least two mounting-side third windows and at least two non-mounting-side third windows,
      at least one central tangential bridge being located between said two middle bridges
   so as to form at least one mounting-side fourth window and at least one non-mounting-side fourth window.

6. The caliper body of claim 1, wherein two adjacent bridges provide a through-window that crosses the caliper body in the axial direction.

7. The caliper body of claim 1, wherein the end bridges have a foil-shaped bridge body.

8. The caliper body of claim 1, wherein the end bridges lie substantially in the same plane.

9. The caliper body of claim 1, wherein said mounting-side elongated portion and said non-mounting-side elongated portion extend in the tangential direction substantially in an arc of a circle housing or forming the cylinders that project from said mounting-side elongated portion and said non-mounting-side elongated portion in a radial outward direction and in the opposite radial direction.

10. The caliper body of claim 2, wherein said two middle bridges are connected together by a central tangential bridge directed tangentially and together with said middle bridges define two through-windows that in the radial direction have a bulb-shaped edge.

11. The caliper body of claim 2, wherein said intermediate bridges house or form mounting portions of the caliper body to a stub axle.

12. The caliper body of claim 1, wherein said at least three central bridges comprise a portion that projects to the non-mounting-side elongated portion with a radially outer surface in which a lightening groove is formed.

13. The caliper body of claim 2, wherein said mounting-side and non-mounting-side elongated portions each house or form three cylinders and are connected together by said two middle bridges, said two intermediate bridges and by said first and second end bridges and by tangential bridges defining ten through-windows in the radial direction to the caliper body and in the axial direction to the caliper body, wherein the caliper body consists of three cylinders including said at least two cylinders and wherein the caliper body consists of a total of six bridges including said first and second end bridges, said two middle bridges, and said two intermediate bridges.

14. The caliper body of claim 1, wherein said caliper body is a monoblock or a body in a single piece and/or a caliper body formed from at least two half-bodies.

15. The caliper body of claim 1, wherein there are two adjacent bridges without the interposition of cylinders between them.

16. The caliper body of claim 2, wherein between said at least two middle bridges there is at least one further bridge extending tangentially.

17. The caliper body of claim 2, wherein between the first end bridge and the adjacent intermediate bridge there is a tangential bridge that in the radial direction is substantially V-shaped or substantially V-shaped with rounded edges.

18. A caliper for a disc brake comprising the caliper body of claim 1.

* * * * *